United States Patent Office 2,874,466
Patented Feb. 24, 1959

2,874,466

PROSTHESES AND PROCESSES FOR THEIR PRODUCTION

Hermann Schnell, Krefeld-Uerdingen, and Dieter Steuer, Frankfurt am Main, Germany, assignors to Farbenfabriken Bayer Aktiengesellschaft, Leverkusen, Germany, a corporation of Germany No Drawing. Application May 14, 1953
Serial No. 355,166

Claims priority, application Germany May 15, 1952

5 Claims. (Cl. 32—2)

This invention relates to prostheses, especially dental prostheses, and processes for their production.

Prostheses, especially dental prostheses, are mostly prepared from polymethyl methacrylates by packing a plastic mixture of monomeric and polymeric methyl methacrylates, which contains polymerization catalysts, into a gypsum mold prepared from an impression taken in the mouth after forming a wax model, and hardening the plastic mixture by polymerization of the monomeric compound under slight pressure at elevated temperature. On account of their physiological and chemical indifference, good compatibility with the tissues of the mouth, good mechanical properties and aesthetic appeal the dental prostheses thus prepared are far superior to those produced from hard rubber. Prostheses of rubber, therefore, have gone into a steady decline as a base for the construction of artificial dentures.

The above described process, however, displays some serious disadvantages. The production of the wax models and the gypsum molds, for instance, is extraordinarily time consuming and wearisome. Furthermore, the prostheses shrink during polymerization carried out at 70–100° C., so that they do not conform exactly to the shape and size of the mold. Besides, the mechanical properties of the prostheses largely depend upon the performance of the polymerization reaction, the temperature, the pressure and the degree of purity of the mixture of polymeric and monomeric compounds so that, in general, the dentist fails to produce prostheses with the most beneficial properties inherent in the monomeric and polymeric compounds used as starting materials. The drawbacks associated with the above described process sometimes lead to the preparation of dentures which do not provide an accurate fit in the mouth, which cause pain due to pressure and are at best restrictedly useful for normal mastication; these dentures, therefore, sometimes require repair after relatively short periods due to crackings or fractures. It has been proposed to eliminate these drawbacks by preparing beforehand in steel molds under high pressure at high temperature, for instance by injection molding, and keeping large stocks of various shapes of base plates, as semi-factured dentures of thermoplastic materials. The dentist has to apply one or more of these base plates to the mouth of the patient to determine the plate that conforms best to the contours of the mouth tissues, to finish them this plate so as to provide a fit as accurate as possible, and to affix the teeth. Owing to the variety of shapes of jaws—everybody has a characteristic, individual shape—this procedure appears to be not very useful. It has further been proposed to produce base plates of thermoplastics on gypsum positive molds under high pressure at high temperature by means of special apparatus. Also this process is not very suitable since the shaping of the thermoplastics usually employed in dentistry requires the application of high pressures and temperatures and the dentist or the technician may fail to accomplish the unobjectionable molding and shaping with simple tools. Furthermore, the gypsum molds will sometimes not resist the high pressures required to shape the plastics.

It is a principal object of the present invention to eliminate the above disadvantages associated with the previously made prostheses and to provide an essentially more simple and convenient process of preparing within a short time prostheses, especially dental prostheses, with improved properties.

In carrying out the present invention an impression is made in the mouth of the patient by means of gypsum or one of the customarily employed resilient impression masses, for instance those on the basis of alginic acid. A positive model is prepared from the impression for instance by casting with gypsum. An appropriately cut plate of a hard and resilient plastic, which is easily deformable at temperatures from about 75° C. upwards and is hard at body temperature and at mouth temperatures, is placed on the positive model. The shaping of the plastic plate may be facilitated by heating the gypsum model to 90–100° C., for instance by placing in boiling water. The plate or sheet is made deformable in the heat, preferably within the temperature range of 80° to 120° C., for instance by immersing in boiling water or boiling salt solutions. The deformable plate is shaped on the gypsum model into a base plate by hand or by means of simple instruments without special auxiliary means, if desired after covering the plate with a thin foil to protect the hands against the temperature; the plate retains its thickness during the shaping operation. The shape of the base plate thus prepared is made permanent by cooling, for instance by immersing in cold water. The model is dried and coated in the usual manner with mold release agents. The model or the surface of the base plates facing the model is coated with a small quantity of a lining mass, for instance a plastic mixture of a polymeric and monomeric vinyl compound or a viscous solution of a polymeric vinyl compound in a monomeric vinyl compound, which mixture or solution is polymerizable at room temperature or slightly elevated temperature, and the previously shaped base plate is put on the model with pressing. The plastic mixture or the viscous solution is thereby distributed into the interspaces between the surfaces of the gypsum model and the base plate and is hardened therein by polymerization within some minutes, an intimate adhesion between the base plate and the mixture or the solution occurring. Since the base plate conformed to the shape of the model to a large extent the sheet or foil applied thereto is extraordinarily thin; its thickness amounts to at most less than 1 mm. The base plate thus prepared is placed in position in the mouth and finished with the usual dental tools so as to provide an accurate fit. It is of special advantage to line the base plate in situ in the mouth of the patient in consideration of the arrangements usually made in taking functional impressions. After placing the artificial teeth consisting of plastics or porcelain in proper position in the mouth by means of wax and, if desired, fixing them to the gypsum model by a support of gypsum the teeth are affixed to the base plate with one of the above described readily polymerizable masses. As a matter of fact, it is also possible to affix the teeth by polymerization in the usual manner under pressure after embedding the base plate in a mold. After finishing the denture is ready for immediate wearing. The denture can be prepared within a very short time so that the patient can wait for his prosthesis. The expenditure of work is substantially lesser than that required according to the previously known techniques. The fit of the denture in the mouth is excellent since the shrinkage occurring during polymerization of the thin layer of the autopolymerizable mass is negligible; no pain due to pressure occurs. The mechanical properties of the dentures substantially depend upon the properties of the plastic deformable plates and are practically not affected during processing. The thickness of the denture is uniform and is decided by the choice of appropriately thick plates. This allows to produce dentures which are especially comfortable to wear. The model is not destroyed during the preparation of the denture. This offers the possibility for the dentist or the technician to control the accurate fit of the denture after preparing and finishing. Furthermore, the models can be stored so that they need not be made again when the dentures require repair.

Apart from dentures, orthodontia appliances, protective plates and dressings after jaw operations, occlusive prostheses, tampon holders can be produced by the herein described process.

Suitable materials for making the resilient plates, which have a plastic deformation below 120° C. and are hard at body temperature and at mouth temperatures, are a great number of plastics for instance of polymers or copolymers, which may contain plasticizers. Suitable copolymers are for instance those of methyl methacrylate and butadiene or its derivatives, methyl methacrylate and acrylates or methacrylates the alcohol radical of which contains more than 3 carbon atoms, for instance butyl methacrylate, octyl methacrylate and dodecyl methacrylate, furthermore of vinyl chloride and acrylates or methacrylates the alcohol radical of which contains more than 3 carbon atoms. Plates with particularly useful properties are frequently obtained by addition of other polymerizable components. Examples of such other polymerizable components are, besides the above said components, styrene and acrylonitrile. Especially suitable are compounds containing at least two polymerizable double bonds, such as divinyl benzene and ethylene glycol dimethacrylate. When these cross-linked copolymers contain small quantities of polyfunctional vinyl compounds they are thermoplastic and are distinguished by increased hardness and resiliency.

Plastics containing plasticizers, which are suitable for the preparation of the thermoplastic plates, are for instance plasticized polymethyl methacrylate. Examples of suitable plasticizers are those which are difficultly volatile and water insoluble, compatible with the thermoplastic plate, which do not irritate the tissues of the mouth and are not toxic, for instance benzyl-butyl-adipinate, phthalic dimethyl-, diethyl-, dibutyl-, dioctyl-ester and benzylbutyl-phthalate.

Plates containing plasticizers, which cannot be worn in the mouth for a period as long as the plates containing no plasticizers, are especially useful for preparing immediate prostheses.

The thickness of the thermoplastic plates amounts to about 0.5–2 mm. It has surprisingly been found that the prostheses prepared from the above defined thermoplastics according to the herein described process resist the mechanical and thermal stresses occurring in the mouth without deformation. Examples of plastic mixtures or viscous solutions, which are polymerizable at room temperature or slightly elevated temperature, are mixtures of polymeric and monomeric methyl methacrylates and solutions of polymethyl methacrylates in methyl methacrylates, which contain Redox systems, for instance such of peroxides and amines, as polymerization accelerators. The thermoplastic plate and the polymerizable solution or plastic mass must be selected so as to effect permanent adhesion between the plastic formed during polymerization and the thermoplastic plate.

The invention is further illustrated by the following examples without being restricted thereto:

*Example 1*

For preparing a partial immediate prosthesis for the upper jaw an impression is taken by means of a resilient mass after extracting the teeth and filled immediately with rapidly setting gypsum. A piece, which approximately conforms to the contours of the mouth, is cut from a 1.5 mm. thick plate of polymethyl methacrylate containing 20 percent by weight of dibutyl phthalate, 0.03 percent by weight of a red pigment and 0.04 percent by weight of a white pigment after making deformable in boiling water, and shaped by hand on the model to a base plate after making deformable again in boiling water; the shape of the plate thus obtained is made permanent by immersing in cold water. The rim of the denture is trimmed down by a milling machine so as to conform to the shape and size of the model. The model is coated with a mold release agent. A small quantity of a plastic mixture of polymeric and monomeric methyl methacrylate, which polymerizes at room tempreature, is applied to the tissue side of the base plate which is then pressed by hand onto the model so that the plastic mixture is distributed completely into the interspaces between the plate and the model. The same material is used for making the rim of the plate except the palatal part. The plastic mass is hardened by polymerization within a short time. The plate is removed from the model and finished in the mouth of the patient. Thereupon teeth of polymethyl methacrylate and clamps are affixed to the plate by polymerization with the above described plastic mixture polymerizing at room temperature. Whereas the part of the thermoplastics show a bright, compact surface the polymerized parts require finishing and polishing. The denture, which is complete after about 45 minutes, has an aesthetic appeal and provides an accurate fit; it does not cause pressure in the mouth and can be worn indefinitely.

*Example 2*

After taking an impression a model is prepared to produce a lower denture. A tin foil is applied with pressing to the surface of the model and the rims of the intended denture are marked. The tin foil is removed, smoothed and placed on a 1.7 mm. thick plastic plate prepared by molding from a copolymer obtained by emulsion polymerization of 86 parts by weight of methyl methacrylate and 14 parts by weight of butadiene, which contains 0.03 percent by weight of a red pigment and 0.04 percent by weight of a white pigment. This plate shows an impact strength of 22 kg./cm.$^2$, a bending strength of 822 kg./cm.$^2$, a bending angle of 65°, a Brinell hardness of 896 cm.$^2$ and an alternate bending number of 82,000. After plasticizing the plate in boiling water a piece is cut out along the marking on the tin foil. After plasticizing this piece once more in boiling water it is shaped to the desired base plate by hand on the gypsum model heated to about 100° C. The hands are protected by placing a foil of cellulose acetate upon the thermoplastic plate during the shaping operation. The shape of the base plate is made permanent by immersing in cold water. The tissue of the base plate is coated with a plastic mass polymerizing at body temperature, as described in Example 1, and applied to the mouth of the patient after protecting the tissue against the action of the monomeric compound by greasing with vaseline. The rim of the denture is shaped in accordance with the usual technique and the plate is made so as to conform exactly to the contours of the tissues of the mouth. After completion of polymerization the teeth of porcelain or polymethyl methacrylate are placed in proper position by means of the articulator. After placing the plate once in proper position in the mouth the teeth are affixed to the base plate on the model by means of a support of gypsum, preferably a two-part support. The wax is melted out and a plastic mass which polymerizes at room temperature is invested instead of the wax after coating the support with a mold release agent. After polymerization the support is removed and the polymerized parts are finished and polished. The denture can be prepared within 60–90 minutes. A lower denture is thus obtained which provides an accurate fit in the mouth, has a good appearance and resists the mechanical and thermal stresses occurring in the mouth for an indefinite period of time.

*Example 3*

A partial upper denture is prepared as described in Example 1 from a plate consisting of a copolymer of 80 parts by weight of methyl methacrylate and 20 parts by weight of dodecyl methacrylate, which contains 5 percent by weight of dibutyl phthalate. The upper denture thus obtained can be worn indefinitely.

We claim:

1. Prostheses comprising (1) a base plate of a plastic consisting of a copolymer of methylmethacrylate and a methacrylate, the alcohol radical of which contains at least 4 carbon atoms, said copolymer being easily deformable at temperatures of about 75° C. upwards and being hard at mouth temperatures, and (2) a lining obtained from a polymerizable mass which is attached to said base plate by polymerization.

2. Prostheses comprising (1) a base plate of a plastic consisting of a copolymer of a halogen-containing vinyl compound and a compound selected from the group consisting of acrylates and methacrylates, the alcohol radical of which contains at least 4 carbon atoms, said copolymer being easily deformable at temperatures of about 75° C. upwards and being hard at mouth temperatures, and (2) a lining obtained from a polymerizable mass which is attached to said base plate by polymerization.

3. A process for the production of a dental prosthesis which comprises positioning a polymerizable composition, which upon polymerization forms a synthetic resin at up to slightly elevated temperatures, between a model and a base plate preformed to conform substantially to the contours of the model, pressing the base plate toward the model to cause said polymerizable composition to fill all the interspaces between the base plate and the model, allowing said composition to polymerize to form a lining on the base plate, and affixing teeth and clamps to the completed base plate by means of a further quantity of the aforesaid polymerizable composition.

4. Process of claim 3 wherein the base plate used is easily deformable at temperatures above about 75° C. and is not deformable at mouth temperatures, said base plate being preformed by plasticizing it at a temperature above about 75° C., pressing it in this plasticized condition on a model, and allowing the plate to cool.

5. Process of claim 3 wherein the synthetic resin formed is a copolymer of (1) a halogen-containing polymerizable vinyl compound and (2) a member of the group consisting of an acrylate and a methacrylate, the alcohol radical of which contains at least 4 carbon atoms.

References Cited in the file of this patent

UNITED STATES PATENTS

| | | |
|---|---|---|
| 2,569,767 | Knock | Oct. 2, 1951 |
| 2,645,012 | Hetzel | July 14, 1953 |